US012710587B2

(12) United States Patent
Buddhiraju et al.

(10) Patent No.: US 12,710,587 B2
(45) Date of Patent: Aug. 18, 2026

(54) FREQUENCY-DOMAIN ARBITRARY LINEAR TRANSFORMATIONS FOR PHOTONS

(71) Applicant: The Board of Trustees of the Leland Stanford Junior University, Stanford, CA (US)

(72) Inventors: Siddharth Buddhiraju, Palo Alto, CA (US); Avik Dutt, Menlo Park, CA (US); Momchil Minkov, San Francisco, CA (US); Ian A.D. Williamson, Palo Alto, CA (US); Shanhui Fan, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 256 days.

(21) Appl. No.: 18/022,228

(22) PCT Filed: Aug. 31, 2021

(86) PCT No.: PCT/US2021/048438
§ 371 (c)(1),
(2) Date: Feb. 20, 2023

(87) PCT Pub. No.: WO2022/047378
PCT Pub. Date: Mar. 3, 2022

(65) Prior Publication Data

US 2023/0324607 A1 Oct. 12, 2023

Related U.S. Application Data

(60) Provisional application No. 63/072,543, filed on Aug. 31, 2020.

(51) Int. Cl.
*G02B 6/122* (2006.01)
*G02B 6/12* (2006.01)
(Continued)

(52) U.S. Cl.
CPC ....... *G02B 6/1225* (2013.01); *G02B 6/12004* (2013.01); *G02B 6/29338* (2013.01);
(Continued)

(58) Field of Classification Search
CPC .............. G02B 6/12004; G02B 6/1225; G02B 6/29338; G02F 1/025; G02F 3/00;
(Continued)

(56) References Cited

U.S. PATENT DOCUMENTS 9,088,371 B2 * 7/2015 Witzens ............ H04B 10/6164
9,182,647 B2 * 11/2015 Akiyama ........... G02B 6/12007
(Continued)

OTHER PUBLICATIONS

Lu et al., "Electro-Optic Frequency Beamsplitters and Tritters for High-Fidelity Photonic Quantum Information Processing", 2017, arXiv:1712.03992v1.

(Continued)

*Primary Examiner* — Ryan A Lepisto
(74) *Attorney, Agent, or Firm* — LUMEN PATENT FIRM

(57) ABSTRACT

One or more optical resonators are coupled to an optical waveguide in sequence. Each of the resonators includes a corresponding modulator. A signal controller is configured to electrically drive each modulator with a corresponding composite electrical signal. Each composite electrical signal includes two or more frequency components of a frequency comb defined by the one or more resonators. The result of this configuration is that an input-output relation between an input of the waveguide and an output of the waveguide is a linear transformation defined by the composite electrical signals using frequencies of the frequency comb as a basis. Such linear transformations can be reciprocal or non-reciprocal, unitary or non-unitary.

10 Claims, 13 Drawing Sheets

(51) Int. Cl.

| | |
|---|---|
| ***G02B 6/293*** | (2006.01) |
| ***G02F 1/025*** | (2006.01) |
| ***G02F 3/00*** | (2006.01) |
| ***G06N 3/067*** | (2006.01) |
| ***G06N 10/40*** | (2022.01) |

(52) U.S. Cl.

CPC ................ *G02F 1/025* (2013.01); *G02F 3/00* (2013.01); *G06N 3/0675* (2013.01); *G06N 10/40* (2022.01); *G02F 2203/15* (2013.01); *G02F 2203/56* (2013.01)

(58) Field of Classification Search

CPC ............ G02F 2203/15; G02F 2203/56; G06N 3/0675; G06N 10/40

See application file for complete search history.

(56) References Cited

U.S. PATENT DOCUMENTS

| | | | | |
|---|---|---|---|---|
| 9,348,154 | B2 * | 5/2016 | Hayakawa | G02F 1/225 |
| 10,126,506 | B2 * | 11/2018 | Mower | H04L 9/0858 |
| 10,768,659 | B2 | 9/2020 | Carolan | |
| 10,877,287 | B2 | 12/2020 | Miller | |
| 11,092,424 | B2 * | 8/2021 | Lipson | G02F 1/3528 |
| 11,139,907 | B2 * | 10/2021 | Melikyan | H04B 1/1027 |
| 11,402,724 | B1 * | 8/2022 | Blanco-Redondo | G02B 6/12007 |
| 11,456,571 | B2 * | 9/2022 | Giunta | H01S 3/1106 |
| 11,537,026 | B2 * | 12/2022 | Zhang | G02F 1/3536 |
| 11,909,165 | B2 * | 2/2024 | Renninger | H01S 3/06725 |
| 2013/0221211 | A1 * | 8/2013 | Witzens | H04B 10/60 250/216 |
| 2017/0293082 | A1 | 10/2017 | Mower | |
| 2019/0204611 | A1 | 7/2019 | Miller | |
| 2020/0064512 | A1 * | 2/2020 | Stark | G02F 1/365 |
| 2020/0202057 | A1 | 6/2020 | Chen | |
| 2021/0373362 | A1 * | 12/2021 | Okawachi | H01S 5/005 |

OTHER PUBLICATIONS

Lukens et al., "Frequency-encoded photonic qubits for scalable quantum information processing", 2017, Optica v4n1, pp. 8-16.

Cai et al., "Multimode entanglement in reconfigurable graph states using optical frequency combs", 2017, Nature Comms. 10.1038/ncomms15645.

Cui et al., "High-Dimensional Frequency-Encoded Quantum Information Processing with Passive Photonics and Time-Resolving Detection", Physical Review Letters 124(19), 190502.

Zhang et al., "Broadband electro-optic frequency comb generation in a lithium niobate microring resonator", 2019, Nature v568, 373.

* cited by examiner

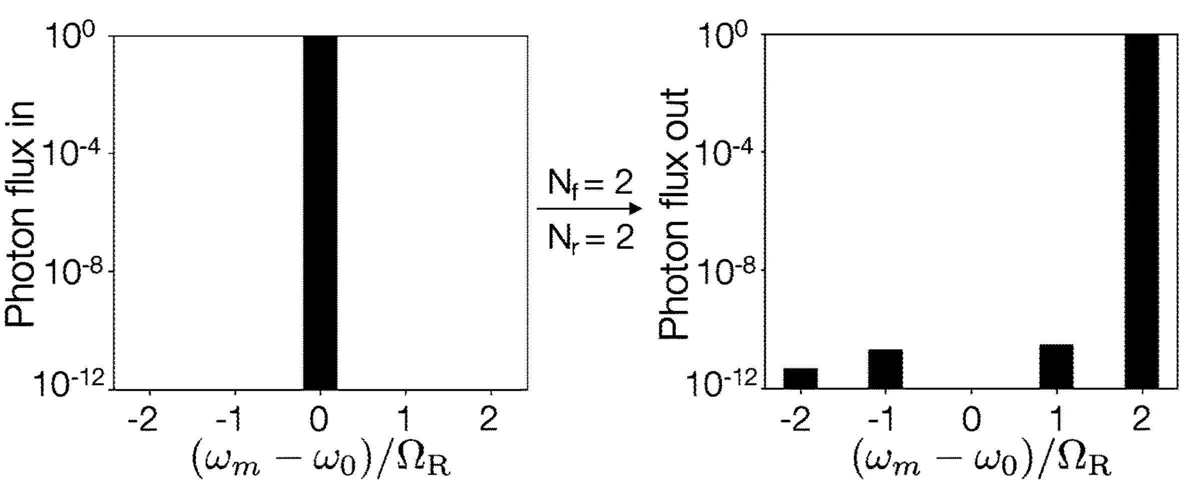
FIG. 2A
FIG. 2B
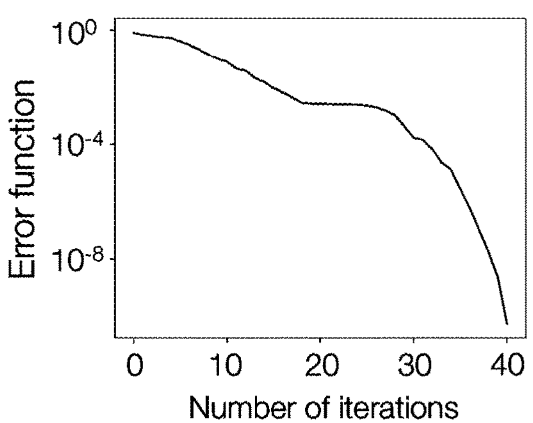
FIG. 2C
| | Ring 1 | Ring 2 |
|---|---|---|
| $\kappa_1/\gamma$ | $1.3508e^{i0.2499\pi}$ | $3.8269e^{i0.2500\pi}$ |
| $\kappa_2/\gamma$ | $2.3574e^{i0.0\pi}$ | $0.4878e^{i\pi}$ |
FIG. 2D

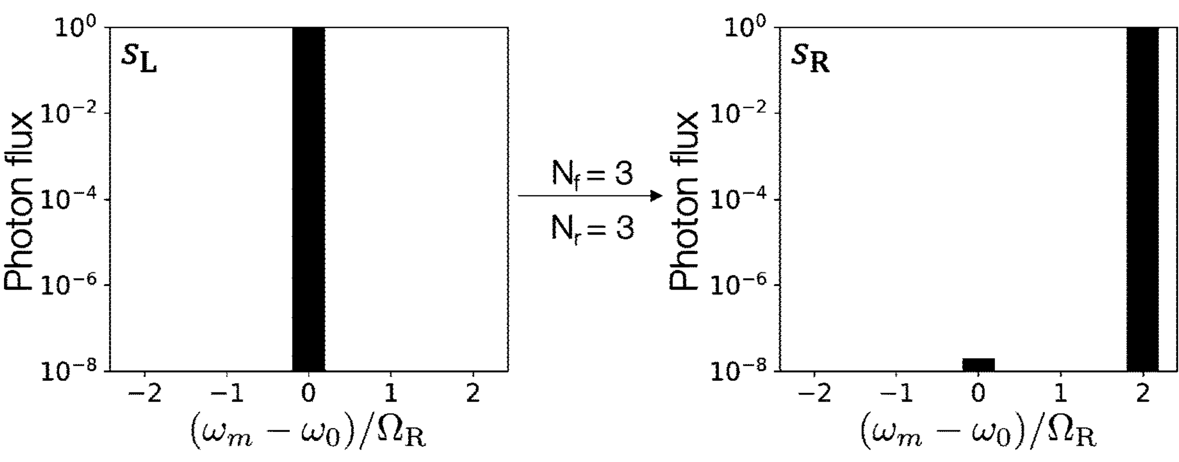
FIG. 3A
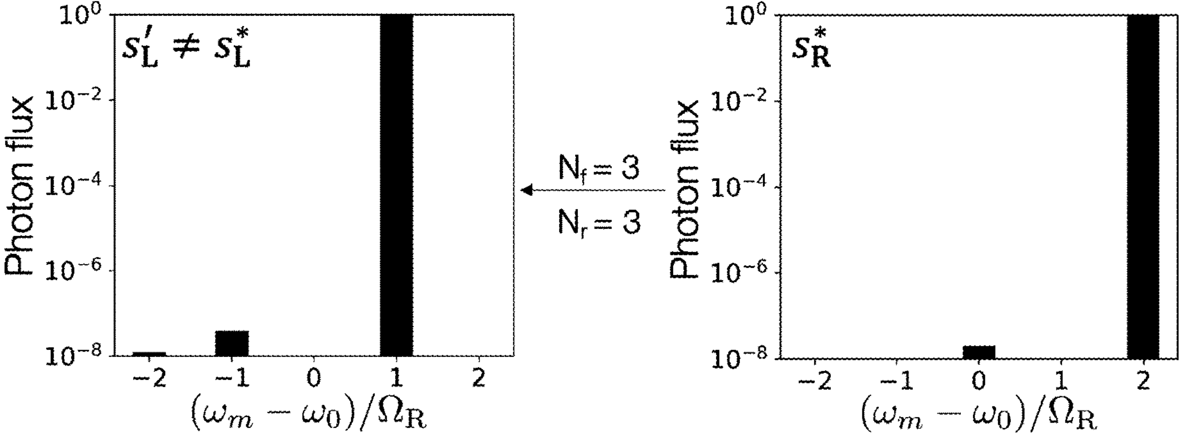
FIG. 3B
| | Ring 1 | Ring 2 | Ring 3 |
|---|---|---|---|
| $\kappa_1/\gamma$ | $0.39e^{i0.3334\pi}$ | $0.1469e^{i0.3331\pi}$ | $0.6757e^{i0.3334\pi}$ |
| $\kappa_2/\gamma$ | $0.0001e^{i0.0\pi}$ | $0.5152e^{i0.1666\pi}$ | $0.0144e^{i0.1661\pi}$ |
| $\kappa_3/\gamma$ | $1.1031e^{i0.0\pi}$ | $0.359e^{i0.0\pi}$ | $1.0308e^{i0.0\pi}$ |
FIG. 3C

| | | | | |
|---|---|---|---|---|
| 0.0000 | 0.0000 | 1.0000 | 0.0000 | 0.0000 |
| 0.0000 | 0.0000 | 0.0000 | 1.0000 | 0.0000 |
| 0.0000 | 0.0000 | 0.0000 | 0.0000 | 1.0000 |
| 0.0000 | 1.0000 | 0.0000 | 0.0000 | 0.0000 |
| 1.0000 | 0.0000 | 0.0000 | 0.0000 | 0.0000 |

FIG. 4A

| | | | | |
|---|---|---|---|---|
| 0.0059 | 0.0911 | 0.9943 | 0.0543 | 0.0039 |
| 0.0370 | 0.0064 | 0.0543 | 0.9963 | 0.0543 |
| 0.0029 | 0.0911 | 0.0074 | 0.0543 | 0.9943 |
| 0.0733 | 0.9889 | 0.0911 | 0.0064 | 0.0911 |
| 0.9966 | 0.0733 | 0.0029 | 0.0370 | 0.0059 |

FIG. 4B

| | | | | |
|---|---|---|---|---|
| 0.0011 | 0.0017 | 1.0000 | 0.0010 | 0.0013 |
| 0.0012 | 0.0006 | 0.0010 | 1.0000 | 0.0008 |
| 0.0005 | 0.0012 | 0.0013 | 0.0008 | 1.0000 |
| 0.0004 | 1.0000 | 0.0017 | 0.0006 | 0.0012 |
| 1.0000 | 0.0004 | 0.0011 | 0.0012 | 0.0005 |

| Frequencies ($N_f$) \ Rings ($N_r$) | 1 | 2 | 3 | 4 | 5 |
|---|---|---|---|---|---|
| 1 | 6.00e-01 | 5.20e-01 | 3.48e-01 | 2.34e-01 | 2.01e-01 |
| 2 | 2.62e-01 | 1.64e-01 | 3.83e-02 | 1.30e-02 | 1.04e-03 |
| 3 | 7.29e-03 | 2.04e-03 | 2.18e-05 | 2.15e-05 | 1.04e-06 |
| 4 | 5.90e-03 | 7.14e-04 | 1.79e-05 | 3.80e-06 | 1.33e-07 |

| | Ring 1 |
|---|---|
| $\kappa_1/\gamma$ | $0.9992e^{i0.5004\pi}$ |
| $\kappa_2/\gamma$ | $0.9990e^{-i0.5004\pi}$ |
| $\kappa_3/\gamma$ | $0.9999e^{i0.5004\pi}$ |
| $\kappa_4/\gamma$ | $1.9992e^{-i0.4996\pi}$ |

FIG. 4E

| | | | | |
|---|---|---|---|---|
| 0.0000 | 0.0000 | 0.0000 | 0.0000 | 0.0000 |
| -0.4000 | -0.8000 | 0.8000 | 0.4000 | 0.0000 |
| -0.8000 | 0.4000 | -0.4000 | 0.8000 | 0.0000 |
| 0.8000 | -0.4000 | 0.4000 | -0.8000 | 0.0000 |
| 0.4000 | 0.8000 | -0.8000 | -0.4000 | 0.0000 |

FIG. 5A

| | | | | |
|---|---|---|---|---|
| -0.0268 | 0.2572 | 0.0554 | -0.1036 | 0.4190 |
| -0.1428 | -0.6894 | 0.7064 | 0.2775 | -0.1036 |
| -0.7446 | 0.3064 | 0.6289 | 0.7064 | 0.0554 |
| 0.6964 | -0.5225 | 0.3064 | -0.6894 | 0.2572 |
| 0.8190 | 0.6964 | -0.7446 | -0.1428 | -0.0268 |

FIG. 5B

| | | | | |
|---|---|---|---|---|
| -0.0003 | -0.0000 | 0.0003 | 0.0000 | -0.0002 |
| -0.3999 | -0.8003 | 0.8005 | 0.4002 | -0.0002 |
| -0.7999 | 0.3999 | -0.4002 | 0.8003 | -0.0005 |
| 0.7998 | -0.4001 | 0.4006 | -0.8001 | 0.0004 |
| 0.4001 | 0.7997 | -0.7998 | -0.3996 | -0.0007 |

FIG. 5C

| Frequencies ($N_f$) \ Rings ($N_r$) | 1 | 2 | 3 | 4 | 5 |
|---|---|---|---|---|---|
| 1 | 5.63e-01 | 4.57e-01 | 3.24e-01 | 2.81e-01 | 2.58e-01 |
| 2 | 3.89e-01 | 1.96e-01 | 9.14e-02 | 1.85e-02 | 4.30e-03 |
| 3 | 3.82e-01 | 1.61e-01 | 1.63e-02 | 8.42e-05 | 6.13e-07 |
| 4 | 2.00e-01 | 5.47e-02 | 2.33e-05 | 7.25e-07 | 8.27e-09 |

| | Ring 1 | Ring 2 | Ring 3 | Ring 4 |
|---|---|---|---|---|
| $\kappa_1/\gamma$ | $0.5937e^{i0.2269\pi}$ | $0.4273e^{i0.5323\pi}$ | $0.8302e^{i0.3744\pi}$ | $0.3750e^{i0.2093\pi}$ |
| $\kappa_2/\gamma$ | $0.5712e^{i0.3739\pi}$ | $1.1299e^{i0\pi}$ | $0.3310e^{i0\pi}$ | $0.6499e^{i0.3417\pi}$ |
| $\kappa_3/\gamma$ | $0.8369e^{i0.2066\pi}$ | $0.5694e^{-i0.6669\pi}$ | $0.6474e^{-i0.6793\pi}$ | $0.3388e^{i0.0561\pi}$ |
| $\kappa_4/\gamma$ | $1.4019e^{i0.3548\pi}$ | $0.0756e^{i0.0\pi}$ | $0.2493e^{-i0.776\pi}$ | $1.0957e^{i0.0814\pi}$ |

| | | | | |
|---|---|---|---|---|
| 0.4933 | 0.3135 | 0.3150 | 0.0745 | 0.7440 |
| 0.2580 | 0.2888 | 0.4420 | 0.7071 | 0.3933 |
| 0.5277 | 0.2382 | 0.1992 | 0.5946 | 0.5211 |
| 0.5616 | 0.1750 | 0.7163 | 0.3755 | 0.0000 |
| 0.3103 | 0.8549 | 0.3907 | 0.0000 | 0.1421 |

FIG. 6A

| | | | | |
|---|---|---|---|---|
| 0.4933 | 0.3134 | 0.3154 | 0.0749 | 0.7439 |
| 0.2579 | 0.2890 | 0.4421 | 0.7071 | 0.3932 |
| 0.5274 | 0.2381 | 0.1992 | 0.5947 | 0.5214 |
| 0.5620 | 0.1750 | 0.7160 | 0.3753 | 0.0003 |
| 0.3100 | 0.8550 | 0.3908 | 0.0001 | 0.1420 |

FIG. 6B

| | | | | |
|---|---|---|---|---|
| 0.2483 | 0.3251 | 0.1519 | -0.1983 | -0.1139 |
| 0.4129 | 0.1608 | 0.0492 | -0.9380 | 0.8155 |
| 0.2319 | 0.1053 | 0.4087 | 0.0998 | 0.9026 |
| 0.0000 | -0.8120 | 0.8377 | 1.0000 | 0.0000 |
| 0.0000 | 0.8512 | -0.3166 | 0.0000 | 1.0000 |

FIG. 6C

| | | | | |
|---|---|---|---|---|
| 0.2487 | 0.3255 | 0.1520 | -0.1968 | -0.1139 |
| 0.4128 | 0.1610 | 0.0494 | -0.9382 | 0.8151 |
| 0.2319 | 0.1053 | 0.4084 | 0.0996 | 0.9023 |
| -0.0001 | -0.8120 | 0.8375 | 0.9995 | -0.0295 |
| -0.0001 | 0.8513 | -0.3166 | 0.7266 | 0.9991 |

FIG. 6D

| | Ring 1 | Ring 2 | Ring 3 | Ring 4 |
|---|---|---|---|---|
| $\kappa_1/\gamma$ | $0.6023e^{i0.6613\pi}$ | $0.9449e^{i0.4425\pi}$ | $0.1696e^{-i0.6438\pi}$ | $1.208e^{i0.481\pi}$ |
| $\kappa_2/\gamma$ | $0.145e^{i0.9533\pi}$ | $0.3338e^{-i0.8814\pi}$ | $0.2973e^{i0.0\pi}$ | $0.2441e^{-i0.2564\pi}$ |
| $\kappa_3/\gamma$ | $0.8391e^{-i0.3493\pi}$ | $0.8065e^{-i0.954\pi}$ | $0.4546e^{i0.4662\pi}$ | $1.0546e^{i0.2438\pi}$ |
| $\kappa_4/\gamma$ | $0.4252e^{-i0.3689\pi}$ | $1.7639e^{i0.1285\pi}$ | $1.0045e^{i0.7818\pi}$ | $0.6614e^{i0.6218\pi}$ |

FREQUENCY-DOMAIN ARBITRARY LINEAR TRANSFORMATIONS FOR PHOTONS

FIELD OF THE INVENTION

This invention relates to optical signal processing.

BACKGROUND

Arbitrary linear transformations in photonics are of central importance for optical quantum computing, classical signal processing and deep learning. A variety of architectures are being actively studied to implement linear transformations for quantum computation and photonic neural networks, including those based on Mach-Zehnder interferometers (MZI), microring weight banks, phase-change materials, and diffractive metasurfaces. All such approaches use path encoding of photons in real space.

By contrast, implementing such linear transformations in frequency space would open avenues beyond those possible with previously reported architectures, which are inherently time-invariant. Photonic synthetic dimensions offer an attractive solution to implement linear transformations in a single physical waveguide by harnessing the internal degrees of freedom of a photon. Synthetic frequency dimensions in particular offer a small spatial footprint and inherent reconfigurability since multiple frequency modes can be addressed simultaneously, and the short- and long-range coupling between them can be controlled by applying an appropriate time-domain signal to a modulator. However, the design of an entire scattering matrix that implements an arbitrary N×N linear transformation in synthetic space, which is essential for many applications in quantum information processing and neural networks, has not yet been shown.

Accordingly, it would be an advance in the art to provide arbitrary N×N linear transformations in synthetic space.

SUMMARY

With the meteoric rise of deep learning and quantum computing, there is a surge in the demand for fast, energy efficient and compact implementations of the constituent algebraic operations in hardware. Among the most common algebraic operations in these areas is matrix-vector multiplication, or equivalently, a linear transformation. Photon-based implementations are particularly appealing due to their speed and low power consumption. In contrast with existing approaches in this domain, our approach offers a significantly more compact footprint as well as many fewer electronic control signals to achieve a given algebraic operation.

Arbitrary linear transformations are of crucial importance in a plethora of applications spanning classical signal processing, communication systems, quantum information processing and machine learning. In this work, we developed a new photonic architecture to achieve arbitrary linear transformations by harnessing the "synthetic" frequency dimension of photons. In one example, our architecture includes electro-optically modulated micro-ring resonators coupled to waveguides, both common fixtures in integrated photonics platforms. By combining numerical optimization methods known as inverse design and automatic differentiation, we tune these photonic structures to physically implement arbitrary linear transformations between input and output frequency modes with near-unity efficiency and favorable area and control-signal scaling. We also show that the same physical structure can be reconfigured to implement a wide variety of transformations including frequency conversion as well as arbitrary unitary transformations (quantum computing) and non-unitary transformations (deep learning). Our approach enables compact, scalable and reconfigurable integrated photonic architectures to achieve arbitrary linear transformations in both the classical and quantum domains using current state-of-the-art technology.

Hardware implementations of linear transformations for machine learning and quantum computing applications are witnessing a surge in demand. Our approach offers a way to implement such arbitrary linear transformations using photon frequencies as information channels with unique advantages over existing hardware. This approach could be used to develop photonic chips that can perform analog mathematical operations in real time.

In comparison to existing hardware approaches, our approach offers a compact footprint, energy efficiency and novel additional functionality (such as spectral shaping of light). Our approach also requires a fewer number of electronic control signals, making it significantly easier to scale up matrix-vector multiplications to larger matrices.

While the above example of ring resonators is particularly suited for fiber-optic implementations of this work, practice of the invention is not fundamentally dependent on ring-shaped resonators. In fact, for on-chip implementations, resonators based on alternative shapes (disks, squares, . . . ) or microstructures such photonic crystals can be envisioned to achieve the identical effect of a comb of frequencies. Likewise, the auxiliary ring structures, which were used to truncate the frequency combs of the main ring resonators, may similarly be replaced by photonic structures of other shapes that identically serve to truncate the comb due to their coupling effect to the main resonators. Moreover, for some resonators, the comb of equally spaced frequencies may be naturally truncated owing to the resonator's physical shape or frequency dispersion in the resonator's material composition, in which case no auxiliary structure may be necessary to truncate the comb.

BRIEF DESCRIPTION OF THE DRAWINGS

FIGS. 2A-D show results from a first implementation example (mode conversion).

FIGS. 3A-C show results from a second implementation example (non-reciprocal mode conversion).

FIGS. 4A-E show results from a third implementation example (5-mode permutation).

FIGS. 5A-E show results from a fourth implementation example (5-mode discrete Fourier transform).

FIGS. 6A-E show results from a fifth implementation example (non-unitary transformation embedded in a larger unitary transformation).

FIG. 7A shows an example of using an auxiliary resonator to truncate the mode spectrum.

DETAILED DESCRIPTION

Section A describes general principles relating to embodiments of the invention. Section B relates to a detailed example. Section C is supplemental information for the example of section B.

A) General Principles

Figure 1:
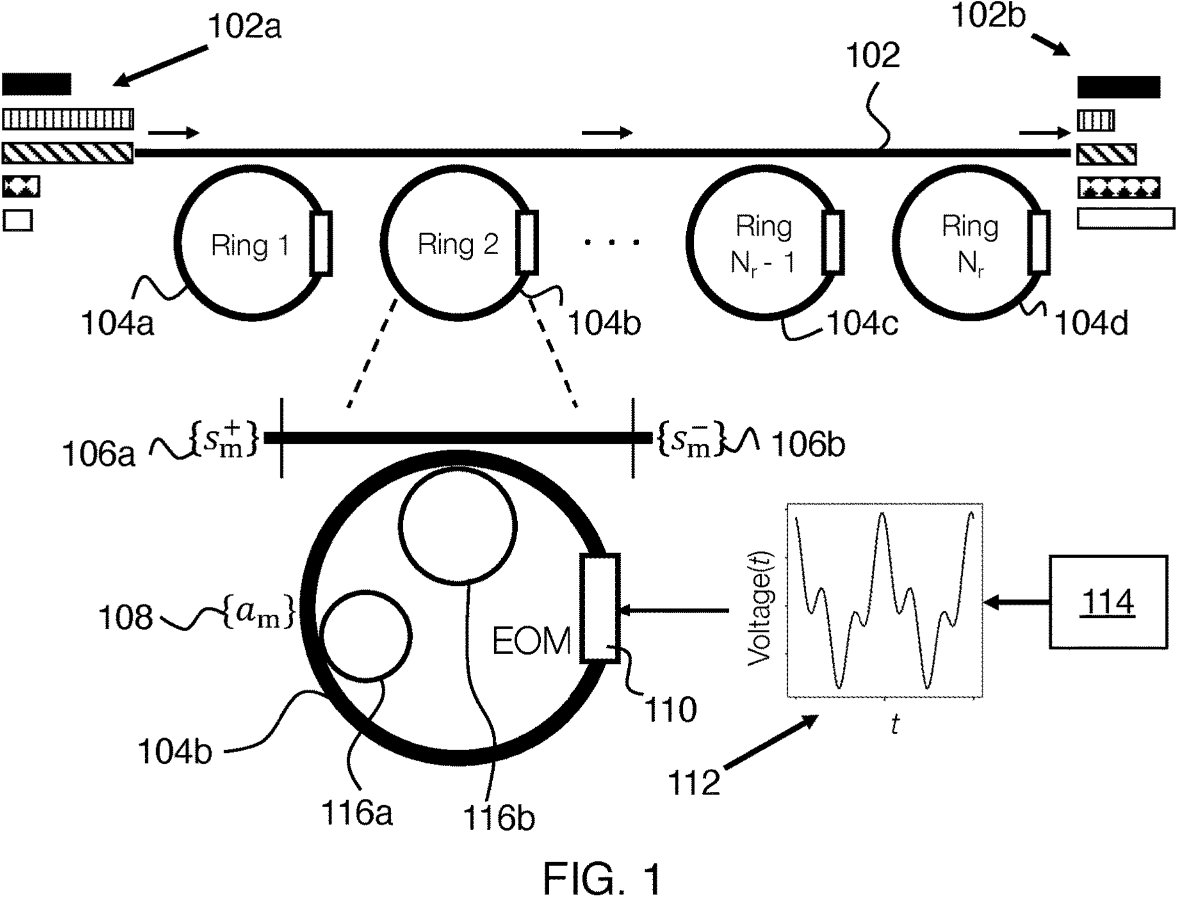
FIG. 1 shows an exemplary embodiment of the invention.

FIG. 1 shows an exemplary embodiment of the invention. In this example, one or more resonators (104*a*, 104*b*, 104*c*, 104*d* etc.) are coupled to a waveguide 102 in sequence. Each of the resonators includes a corresponding modulator (e.g. modulator 110 is the modulator for resonator 104*b*). A signal controller 114 is configured to electrically drive each modulator with a corresponding composite electrical signal. FIG. 1 shows composite electrical signal 112 being provided to modulator 110. The signals provided by signal controller 114 to the other modulators are not shown to reduce clutter on the figure. Typically a different composite signal is provided to each modulator. Each composite electrical signal includes two or more frequency components of a frequency comb defined by the one or more resonators.

Here a "frequency comb defined by one or more resonators" is a frequency comb that the resonators all have in common. In practice this frequency comb is usually band-limited to have a well-defined number of frequencies, as opposed to extending arbitrary multiples of the FSR away from the center frequency. This kind of matching requires the resonators to each have the same free spectral range (FSR) and the same center frequency. Normal fabrication tolerances typically provide sufficiently accurate matching of resonator free spectral ranges, especially in view of the band-limiting typically employed. Matching of resonator center frequencies can be done by making the resonator center frequency adjustable (e.g., with a fiber stretcher for a fiber ring resonator). Such adjustments can be placed under closed-loop control to prevent drift of the resonators away from the matched frequencies condition.

The result of this configuration is that an input-output relation between an input of the waveguide and an output of the waveguide is a linear transformation defined by the composite electrical signals using frequencies of the frequency comb as a basis. This is schematically shown on FIG. 1 as transformation of an input mode distribution 102*a* (i.e., amplitudes of 5 modes) to an output mode distribution 102*b* (i.e., different amplitudes of the 5 modes). In general the input-output relation also includes phase shifts, although pure-amplitude transformations and pure-phase transformations are possible special cases.

One or more of the resonators can have adjustable center frequencies. In such cases, a closed-loop controller can be configured to adjust the adjustable center frequencies of the adjustable resonators to lock the selected resonators to the frequency comb. Such a closed-loop controller can be integrated with signal controller 114 or be a separate component.

Preferably one or more of the resonators are band-limited and act only on a well-defined set of frequencies of the frequency comb. One way to implement such a band-limited resonator is to couple it to one or more auxiliary resonators such that selected resonator modes of the band-limited resonator are perturbed away from the frequency comb to provide band-limiting. 116*a* and 116*b* on FIG. 1 schematically show such auxiliary resonators. Further details on this point are provided in section C.

The composite electrical signals can be derived from the linear transformation using automatic differentiation to expedite gradient-based inverse numerical design.

The linear transformation can be unitary or non-unitary. The linear transformation can be reciprocal or non-reciprocal.

B1) Introduction

Arbitrary linear transformations in photonics are of central importance for optical quantum computing, classical signal processing and deep learning. A variety of architectures are being actively studied to implement linear transformations for quantum computation and photonic neural networks, including those based on Mach-Zehnder interferometers (MZI), microring weight banks, phase-change materials, and diffractive metasurfaces. All such approaches use path encoding of photons in real space. By contrast, implementing such linear transformations in the frequency space would open avenues beyond those possible with previously reported architectures, which are inherently time-invariant. For example, frequency-space transformations allow spectrotemporal shaping of light and generation of new frequencies, with wide-ranging applications in frequency metrology, spectroscopy, communication networks, classical signal processing and linear optical quantum information processing. Nonlinear optics has traditionally been the workhorse for such spectrotemporal shaping, but the requirement of high-power fields and the difficulty of implementing arbitrary linear transformations motivates new architectures for manipulating states in the frequency domain. To that end, photonic synthetic dimensions offer an attractive solution to implement linear transformations in a single physical waveguide by harnessing the internal degrees of freedom of a photon. Synthetic frequency dimensions in particular offer a small spatial footprint and inherent reconfigurability since multiple frequency modes can be addressed simultaneously, and the short- and long-range coupling between them can be controlled by applying an appropriate time-domain signal to a modulator.

Previous works have considered implementing photonic linear transformations using different frequency channels in parallel but without frequency conversions among them by demultiplexing the different frequencies into separate spatial channels. Additionally, optimized fast modulation has been used for tailoring single photon spectra from two-level quantum emitters, or for quantum frequency conversion and linear optical quantum computation, where the modulator is used as a generalized beam splitter in synthetic frequency dimensions. However, the design of an entire scattering matrix that implements an arbitrary N×N linear transformation in synthetic space, which is essential for many applications in quantum information processing and neural networks, has not yet been shown.

Here, we show that arbitrary linear transformations can be performed directly in the synthetic space spanned by the different frequency modes carried by a single physical waveguide. We use gradient-based inverse design to automate the process of designing the linear transformations, and demonstrate that a wide variety of transformations can be realized. As examples, we show single-frequency conversion, nonreciprocal frequency translations as well as general arbitrary unitary and non-unitary transformations, all achieved with high fidelities in a fully reconfigurable fashion.

B2) Results

B2.1) Theory

Consider a ring of radius R formed by a single mode waveguide with a refractive index n. The ring is coupled to an external waveguide of the same refractive index. Assuming sufficiently weak coupling between the ring and the external waveguide and neglecting group-velocity dispersion, the eigenmodes 108 of the ring occur at frequencies $\omega_m=\omega_0+M\Omega_R$, where $\omega_0$ is the central frequency, m is an integer and $\Omega_R=c/nR$ is the free spectral range (FSR) of the ring in angular frequency units, with c being the speed of light in vacuum. These eigenmodes take the form $e^{-i(m_0+m)\phi}$, where $m_0$ denotes the angular momentum of the 0th mode and $\phi$ is the azimuthal coordinate of the ring. Corresponding to these eigenmodes, we define $a_m(t)e^{i\omega_m t}$ to be the amplitude of the mode centered at $\omega$, normalized such that $|a_m(t)|^2$ corresponds to the photon number in the $m^{th}$ mode. Likewise, we define $$s_m^{\pm}(t)e^{i\omega_m t}$$

to be the amplitudes of the modes of the external waveguide at the input and output ports, respectively, as shown by 106*a* and 106*b* on FIG. 1. The coupling between the ring modes and waveguide modes at frequency $\omega_m$ is described by an external coupling rate $$\gamma_m^e,$$

while other losses occurring in the ring, such as absorption or bending loss, are captured by an internal decay rate $$\gamma_m^i.$$

Lastly, we assume that the dielectric constant of the ring is modulated using an electro-optic modulator in the form $$\sum_{l=1}^{N_f} \delta\epsilon_l(\phi)\cos(l\Omega_R t + \theta_l),$$

where $\delta\epsilon_l$ is the depth of the modulation and $\theta_l$ is the phase of the modulation at frequency $l\Omega_R$. The angular dependence $\delta\epsilon_l(\phi)$ occurs due to the physical localization of the electro-optic modulator to a specific range of $\phi$, as shown in FIG. 1. The dynamics of the coupled ring-waveguide system can be described by a coupled-mode theory given by:

$$-id_t a_m = i(\gamma_m^e + \gamma_m^i)a_m + \sqrt{2\gamma_m^e}\, s_m^+ + \sum_{l=1}^{N_f}(\kappa_l a_{m-l} + \kappa_{-l} a_{m+l}) \tag{1}$$

$$s_m^- = s_m^+ + i\sqrt{2\gamma_m^e}\, a_m \tag{2}$$

where $$\kappa_{\pm l} = -\frac{\alpha_l}{4n^2} e^{\mp i\theta_l} \int_0^{2\pi} e^{\mp il\phi} \delta\epsilon_l(\phi) d\phi \tag{3}$$

is the modulation-induced coupling between the modes of the ring, with $\alpha_l$ describing the radial and zenith-angle overlap of the eigenmodes of the ring with the electro-optic modulator.

If the $\delta\epsilon_l$ are real, i.e., only the real part of the refractive-index is modulated, then $$\kappa_l^* = \kappa_{-l}.$$

Therefore, the modulation conserves the total photon number summed across all frequency channels. Further, if $$\gamma_m^i$$

are negligible, then no photons are lost to absorption or radiation. Under these conditions, the setup of Eqs. (1-2) implements a unitary transformation between the fields $$s_m^+$$

at the input ports and the fields $$s_m^-$$

at the output ports. This unitary transformation can be obtained by first converting Eq. (1) to the frequency domain, resulting in $$a = [\Delta\omega - i\Gamma - K]^{-1}\sqrt{2\Gamma}\, s^+ \tag{4}$$

where $a=\{\ldots a_{-1}, a_0, a_1, \ldots\}^t$, $$s^{\pm} = \{\ \ldots\ s_{-1}^{\pm}, s_0^{\pm}, s_1^{\pm} \ldots\ \}^t,$$

$$\Gamma = \text{diag}\,(\ \ldots\ , \gamma_{-1}^e, \gamma_0^e, \gamma_1^e, \ \ldots\ ),$$

$\Delta\omega$ is a constant detuning of the equally spaced frequencies of input comb $s^+$ from the ring's resonant frequencies, and $K_{mm'}=k_{m-m'}$ as defined by Eq. (3). Then, from Eq. (2), we obtain $s^-=Ms^+$, where $$M = \left[I + i\sqrt{2\Gamma}\,[\Delta\omega - i\Gamma - K]^{-1}\sqrt{2\Gamma}\right] \tag{5}$$

A direct verification of the unitarity of M has been performed. In the idealized situation as described above, where the ring-waveguide system is assumed to be single-moded over a broad bandwidth and is free from group velocity dispersion, the matrix M is infinite-dimensional. In practice, the dimensionality of the scattering matrix can be controlled by introducing a "truncation" along the frequency dimension. Such a truncation can be implemented using one or more auxiliary rings coupled to the main ring (see Section C). The auxiliary rings couple to and perturb a few modes immediately outside the $(2N_{sb}+1)$ modes around the $0^{th}$ mode, dispersively shifting and splitting them. These perturbed modes have frequencies such that the modulation tones of $l\Omega_R$ cannot couple these modes to the $(2N_{sb}+1)$ modes of interest. Therefore, the total number of modes under consideration in the coupled ring-waveguide system is $2N_{sb}+1$, and the scattering matrix defined in Eq. (5) is of size $(2N_{sb}+1)\times(2N_{sb}+1)$.

A major objective of this work is to show that an arbitrary scattering matrix of size $(2N_{sb}+1)\times(2N_{sb}+1)$ can be created. To that end, we first note that the number of real degrees of freedom in the scattering matrix (Eq. (5)) of a single ring under modulation is equal to twice the number of distinct modulation tones, $2N_f$, provided the modulation amplitudes $\delta\epsilon_l$ and phases $\theta_l$ are independently controllable. Since the system is truncated to have $2N_{sb}+1$ frequencies, the largest harmonic of $\Omega_R$ that will result in nonzero coupling between any two modes is $2N_{sb}$, i.e., $N_f \leq 2N_{sb}$. Since an arbitrary unitary matrix of size $(2N_{sb}+1)\times(2N_{sb}+1)$ has $(2N_{sb}+1)^2$ real degrees of freedom whereas $N_f \leq 2N_{sb}$, we conclude that a single modulated ring is insufficient to approximate an arbitrary unitary matrix to a high degree of accuracy, even if all modulation tones up to $2N_{sb}\Omega_R$ are used. To overcome this problem, notice that products of unitary transformations are also unitary. Therefore, as shown in FIG. 1, instead of a single ring, we consider a sequence of $N_r$ rings (104*a*, 104*b*, 104*c*, 104*d*, etc.) with each ring providing $N_f$ complex degrees of freedom. Thus, if the total degrees of freedom in series of rings coupled to the waveguide, given by $2N_fN_r$, exceeds $(2N_{sb}+1)^2$, then the setup of FIG. 1 should be able to approximate an arbitrary unitary transformation to a high degree of accuracy.

Below, we optimize these $2N_fN_r$ degrees of freedom to enable physical approximation of arbitrary unitary and certain non-unitary transformations. For unitary transformations or parts thereof, we use as the objective function the fidelity, which measures the accuracy of an approximation V to a unitary transformation U:

$$F(U, V) = \frac{|\langle U, V\rangle|}{\sqrt{\|U\|_F\|V\|_F}} \tag{6}$$

where $(U,V)=\Sigma_{ij}U^*_{ij}V_{ij}$ is the element-wise inner product and $$\|U\|_F = \sqrt{\sum_{ij}|U_{ij}|^2}$$

is the Frobenius norm. The use of an absolute value in Eq. (6) allows for the tolerance of a single global phase, i.e., if $F(U,V)=1$, then the transformation V achieved by the architecture is equal to $Ue^{i\Phi}$ for some phase $\Phi$. To achieve a high fidelity for a given target matrix we use gradient-based inverse design to optimize the parameters of the modulated system. To enable such optimization, we implemented a numerical model of the unitary transformations defined by Eq. (5) in an automatic differentiation framework. While explicitly defined adjoint variable methods have been widely used for photonic inverse design, automatic differentiation is the generalization of the adjoint variable methods to arbitrary computational graphs. Automatic differentiation has recently been successfully applied to the inverse design of photonic band structures as well as photonic neural networks, where explicit adjoint methods are challenging to implement. Here, automatic differentiation enables the efficient computation of the gradients of a scalar objective function with respect to complex control parameters, which in this case are the coupling constants $k_{\pm l}$ as defined in Eq. (3). The advantage of using automatic differentiation is that one needs only to implement the computational model as described above, while the automatic differentiation framework manages the gradient computation through an efficient reverse-mode differentiation. Using the gradients from automatic differentiation, the Limited-memory Broyden-Fletcher-Goldfarb-Shanno (LBFGS) algorithm is used for optimization.

B2.2) Implementation of Linear Transformations

For the results in this Section, we assume that the ring-waveguide system under consideration operates with $N_{sb}=2$, i.e., 5 equally spaced lines followed by at least 4 perturbed lines on each side. The five relevant modes are indexed {−2, −1, 0, 1, 2}. For simplicity, we assume that all five ring modes couple to the waveguide with equal strength, i.e., $$\gamma_m^e = \gamma \text{ and } \gamma_m^i = 0$$

for all m. We also assume that the source frequencies in the waveguide are on resonance with the ring, i.e., $\Delta\omega=0$ in Eq. (5). Examples of finite intrinsic loss $$(\gamma_m^i \neq 0)$$

and non-uniform detuning ($\Delta\omega\neq 0$) have also been considered. Note that the different source frequencies' phases should not drift with respect to each other during the timescale of the transformation. To ensure such phase coherence between the different input frequency modes, the source could be a mode-locked laser or an electro-optic frequency comb with a tailored amplitude/phase spectrum to implement the input vector. Alternatively, active phase stabilization could be implemented to compensate for slow-timescale phase drifts. Under the assumptions made in this Section, the transformation in Eq. (5) is completely determined by the ratios $k_l/\gamma$, where $k_l$ is controlled by the index perturbation amplitude $\delta\epsilon_l$ and phase $\theta_l$, as described by Eq. (3). Therefore, we optimize the amplitude and phase of $k_l$ (in units of $\gamma$) for $N_r$ rings and $N_f$ modulation tones per ring to implement a variety of transformations. Note that since we only optimize for the ratios $k_l/\gamma$, our approach is robust to variations in $\gamma$ during fabrication.

First, we consider the application of such ring-waveguide networks to implement high-fidelity frequency translation that is useful for frequency-domain beam-splitters or single-qubit gates. As an example, we show a design where an input signal in mode 0, after forward propagation through the network, results in a complete conversion to mode +2. Using our inverse-design framework, such a frequency translation corresponds to designing only one column of a unitary transformation and can be achieved with a fidelity exceeding $1-10^{-5}$ using just two rings and two modulation tones per ring, as shown in FIGS. 2A-B. In FIG. 2C, we present the error function versus the number of iterations. The error function is defined as $1-F_{+2}$, where $F_{+2}$ is the normalized output photon flux in the mode +2. After a few iterations, almost all the photon flux is converted to frequency $\omega_{+2}$ at the output. FIG. 2D is a table of $k_l/\gamma$ values for the example of FIG. 2B.

In addition to such high-fidelity frequency conversion implemented in forward propagation through the network, the transformations achieved in this architecture can be different in forward and reverse propagation due to the relative phase shift between the modulation tones across the different rings and the explicit time-varying nature of the dynamically modulated system. This is in sharp contrast with MZI-based architectures, which are inherently reciprocal. As an example, we show in FIGS. 3A-B that we can simultaneously realize with a fidelity exceeding $1-10^{-5}$ a frequency shift, say, $0\rightarrow2$, in forward propagation (FIG. 3A) and a different shift, say, $2\rightarrow1$, in reverse propagation (FIG. 3B) with three modulated rings. On FIG. 3B, the complex-conjugated output profile, $s_R^*$, injected back into the output port results in a 99.999% conversion efficiency from mode +2 to +1 instead of mode 0 in backward propagation through the same system, indicating highly efficient nonreciprocal frequency shifts. FIG. 3C is a table of $k_l/\gamma$ values for the example of FIGS. 3A-B.

Figures 4C, 4D:
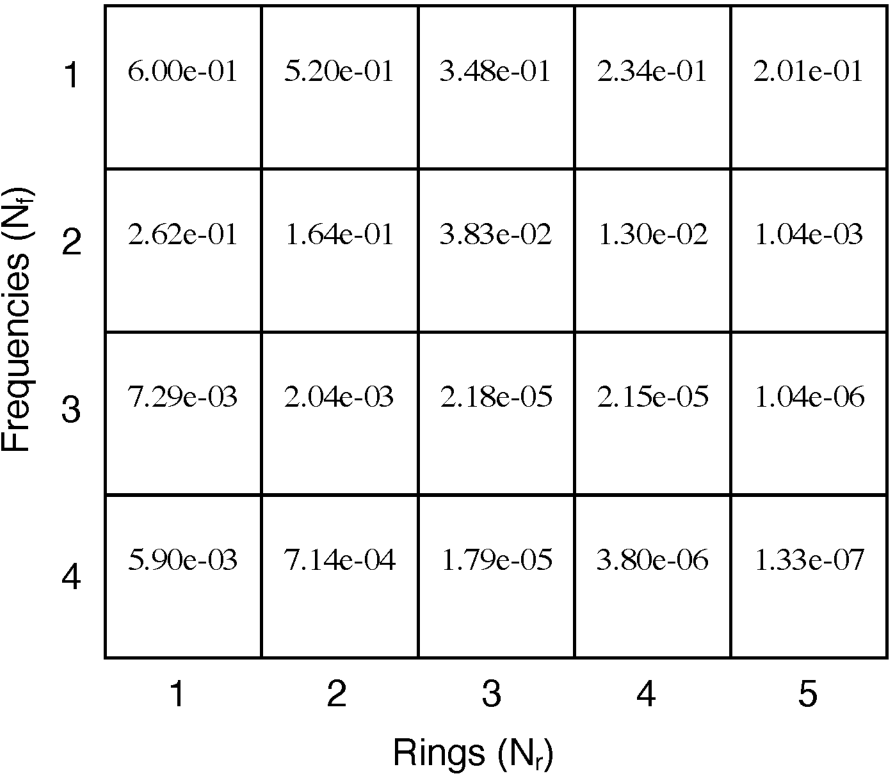

Achieving frequency shifts using modulated rings, as shown in FIGS. 2A-D and 3A-C, requires designing only one and two columns of the 5×5 unitary matrix, respectively. On the other hand, if the number of modulation tones $N_f$ and/or the number of rings $N_r$ are increased, an arbitrary unitary transformation can be achieved with a high fidelity. As an example, we depict in FIG. 4A a 5×5 permutation matrix U, defined by $U_{13}=U_{24}=U_{35}=U_{42}=U_{51}=1$, and zero otherwise. In FIG. 4B, we present the amplitudes of the matrix achieved using one ring and four modulation tones, resulting in a fidelity of $1-5.9\times10^{-3}$. With four rings and four modulation tones, the fidelity is boosted to over $1-3.8\times10^{-6}$, as shown by the amplitudes in FIG. 4C. In FIG. 4D, we tabulate as a function of $N_r$ and $N_f$ one minus the maximum fidelities obtained in approximating the 5×5 permutation matrix, showing that very high fidelities can be achieved using a wide variety of $N_r$ and $N_f$ combinations. FIG. 4E is a table of $k_l/\gamma$ values for the example of FIG. 4C.

Figures 5D, 5E:
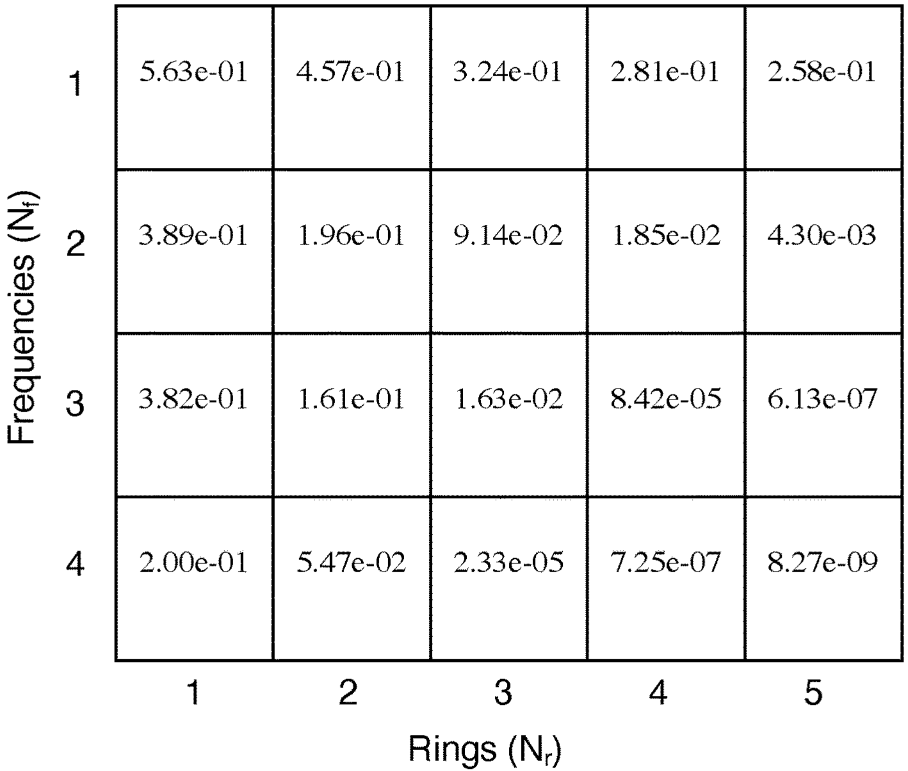

In FIGS. 4A-E, we considered only the accuracy of the amplitudes achieved by our inverse-design approach. We now show that our architecture can also capture the phase of an arbitrary unitary transformation with a high fidelity. To demonstrate this, we consider a normalized 5×5 Vandermonde matrix, which is used to implement the discrete Fourier transform. This unitary transformation, defined by $U_{mn}=e^{-2\pi imn/5}/\sqrt{5}$, has a constant amplitude across its matrix elements but significantly varying phase, as shown in FIG. 5A. With the use of one ring and four modulation tones, the inverse-design algorithm is able to achieve a fidelity of 0.8, with the corresponding phase profile shown in FIG. 5B up to a global phase of 0.0099π. As depicted in FIG. 5C, a significantly better performance is possible with the use of four rings and four modulation tones per ring, achieving a fidelity of $1-7.25\times10^{-7}$ with a global phase of 0.596π. A map of one minus the maximum fidelities achieved by our inverse design approach as a function of the number of rings and modulation tones is shown in FIG. 5D. FIG. 5E is a table of $k_l/\gamma$ values for the example of FIG. 5C.

While unitary transformations are usually required for quantum information processing, matrices used in classical signal processing and in neural networks are in general non-unitary. The architecture presented thus far can also be used to implement non-unitary matrices with singular values less than or equal to one using one of two techniques. First, such non-unitary matrices can provably be embedded in larger unitary matrices using their singular value decomposition. Subsequently, the larger unitary matrices can be implemented using refractive index modulation as discussed thus far. As an example, we consider the following 3×3 non-unitary matrix that was randomly generated subject to the constraint that its largest singular value is equal to one:

$$M=\begin{pmatrix} 0.4993e^{i0.2483\pi} & 0.3135e^{i0.3251\pi} & 0.3150e^{i0.1519\pi} \\ 0.2580e^{i0.4129\pi} & 0.2888e^{i0.1608\pi} & 0.4420e^{i0.0492\pi} \\ 0.5277e^{i0.2319\pi} & 0.2382e^{i0.1053\pi} & 0.1992e^{i0.4087\pi} \end{pmatrix} \tag{7}$$

The singular values of M are 1, 0.3755 and 0.1421, respectively.

Since there are two singular values less than 1, M can be extended into a unitary matrix by adding two dimensions.

Figures 6E, 7A:
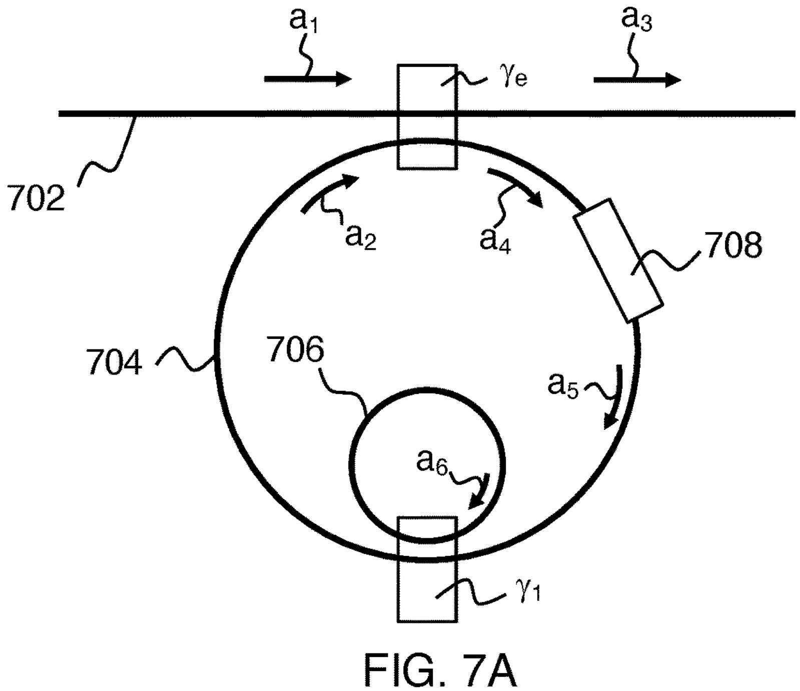

The element-wise amplitude and phase corresponding to the extended 5×5 unitary matrix are shown in FIGS. 6A and 6C, respectively. Using four rings ($N_r=4$) and four modulation tones per ring ($N_f=4$), our inverse-design algorithm achieves the extended unitary matrix with a fidelity exceeding $1-10^{-5}$, as shown in FIGS. 6B and 6D. Notice that the phase of element (5, 4) is significantly different between FIGS. 6C and 6D, but this is because the target amplitude for this element is zero. FIG. 6E is a table of $k_l/\gamma$ values for the example of FIGS. 6A-D.

As an alternative approach, amplitude modulation, where the imaginary part of the refractive index is also modulated, can also be used to directly implement non-unitary matrices since the transformation of Eq. (5) is non-unitary under modulation of the imaginary part of the refractive index. Lastly, in order to implement matrices with singular values greater than 1, a gain element is necessary. For such matrices, a scaled version such that the singular values are below 1 can first be implemented using the methods outlined above, after which a uniform amplification for all frequency channels can rescale the matrix to its intended form.

B3) Discussion

We have shown that combining the concepts of synthetic dimensions and inverse design enables the implementation of versatile linear transformations in photonics. A major advantage of using synthetic frequency dimensions for implementing an N×N linear transformation is that only O(N) photonic elements (modulators in our case) need to be electrically controlled. This is in contrast to real-space dimensions using path-encoding, such as MZI meshes or crossbar arrays, where the full $O(N^2)$ degrees of freedom need to be electrically controlled. Such control is non-trivial both from a scalability perspective as well as from a practical geometrical perspective of connecting $N^2$ tunable elements (e.g. phase-shifters) to their driving electronics off-chip. The reduction in the number of individually controlled elements from $O(N^2)$ to O(N) in our scheme comes from the fact that the driving signal on each of the $N_r$ EOMs can simultaneously address $N_f$ frequency modes in the synthetic dimension.

Future work could leverage synthetic frequency dimensions for complicated quantum information protocols beyond single-qubit unitary transformations, such as realizing probabilistic entangling gates for linear optical quantum computing (LOQC). In particular, spectral LOQC using EOMs and pulse shapers has been shown to be universal for quantum computation. However, pulse shapers involve demultiplexing the frequency modes into distinct spatial channels using gratings to apply mode-by-mode phase shifts, and limit the number of modes that can be accommodated within the modulator bandwidth due to a finite spectral resolution, thus reducing the benefit of using synthetic frequency dimensions. Such pulse shapers are also lossy and challenging to integrate on chip. Our architecture obviates the pulse shaper by exclusively using EOMs. The advent of ultralow-loss nanophotonic EOMs in lithium niobate, as well as progress in silicon and aluminum nitride makes our architecture fully compatible with on-chip integration, since modulation at frequencies exceeding the ring's FSR have been demonstrated.

For applications in neural networks, the performance of our architecture in terms of the speed, compute density and energy consumption for multiply-and-accumulate (MAC) operations is important. Assuming we need N modulation tones and N rings with FSR $\Delta f=\Omega_R/2\pi$ to implement a matrix, we can input information encoded in the N frequencies and read out the matrix-vector product, which amounts to $N^2$ MAC operations. Since we need a frequency-resolved measurement, the fastest readout bandwidth is $\Delta f$. We assume that the input data can be prepared at speed comparable to or faster than the readout speed. Then, the computational speed in MACs per second is given by $$C=N^2\Delta f \tag{8}$$

The maximum number of channels is limited by the FSR and the modulation bandwidth. If we utilize the whole available bandwidth, $B=N\Delta f$, then the speed is $$C=NB \tag{9}$$

For a modulation bandwidth of 100 GHZ and an FSR of 100 MHz (such that N=1000), this yields a speed $C=10^{14}$ MACs per second or 100 TMAC per second, which is comparable with MZI meshes. Although achieving such small FSRs on chip is challenging, recent progress in integrating low-loss delay lines on chip holds promise, since meter-scale delays were reported in an 8 $mm^2$ footprint using spiral resonators, corresponding to an equivalent FSR of ~350 MHz. These design techniques can be extended to lithium niobate rings with high modulation bandwidths.

To optimize for computation density, i.e. MACs per second per unit area, one can use a larger FSR $\Delta f$=1 GHZ, in a 1-$mm^2$ footprint, and combine synthetic frequency dimensions within each 100-GHz modulation bandwidth with wavelength-division multiplexed channels separated by 100-GHz-wide stopbands, to parallelize several uncoupled MAC operations across the 5 THz telecommunications band, as has been done for crossbar arrays. This leads to a compute density of ~10 TMAC $s^{-1}$ $mm^{-2}$, which is much better than MZI meshes and comparable with standard silicon microring crossbar arrays, with the added advantage of only O(N) electronically controlled elements. We anticipate that future progress in modulation speed and power using high-confinement integrated photonic platforms will push these current estimates further, leading to experimental implementations of MAC operations using the architecture proposed here with improvements in complexity, speed, power and footprint.

C) Truncation of Modes in the Synthetic Frequency Dimension

A ring resonator with a large circumference $L=2\pi R$ supports a large number of resonant modes spaced approximately equally by the FSR. To achieve the high fidelities presented in this work, it is preferred to truncate the number of modes into which the input photons can couple so as to prevent the leakage of photons into undesired modes outside the $2N_{sb}+1$-mode-wide band of interest. Here, we discuss in detail one method to achieve this truncation and numerically show its performance using a scattering matrix (S-matrix) analysis. For this purpose, consider a small auxiliary ring 706 of length $L_1$ coupled to the main ring 704 with a frequency-independent strength $t_1$, as shown in FIG. 7A. The main ring 704 is coupled to a waveguide 702 via coupling Ye as described above. A modulator 708 modulates light propagating in main ring 704, also as described above.

We first discuss the unmodulated system. The S-matrices linking the fields at various points in the ring can be written as $$\begin{pmatrix} a_3 \\ a_4 \end{pmatrix} = S_0 \begin{pmatrix} a_1 \\ a_2 \end{pmatrix} \tag{10}$$

$$\begin{pmatrix} a_2 e^{-i\theta_0/2} \\ a_6 e^{-i\theta_1} \end{pmatrix} = S_1 \begin{pmatrix} a_5 e^{i\theta_0/2} \\ a_6 \end{pmatrix} \tag{11}$$

where $\theta_0=\beta(\omega)L+i\alpha L$ incorporates the effect of phase accumulation and amplitude attenuation as light propagates around the ring and $\theta_1=\beta(\omega)L_1+i\alpha L_1$ describes similar effects in the auxiliary ring. $\alpha$ is the propagation loss per unit length such that $\alpha L/T_R=\gamma_i$, where $T_R=2\pi/\Omega_R$ is the round-trip time. The matrices $S_0$ and $S_1$, which describe the directional couplers coupling the main ring to the external waveguide and to the auxiliary ring, respectively, have the form:

$$S_0 = \begin{pmatrix} \sqrt{1-t_e^2} & it_e \\ it_e & \sqrt{1-t_e^2} \end{pmatrix} \quad S_1 = \begin{pmatrix} \sqrt{1-t_1^2} & it_1 \\ it_1 & \sqrt{1-t_1^2} \end{pmatrix} \tag{12}$$

Figure 7B:
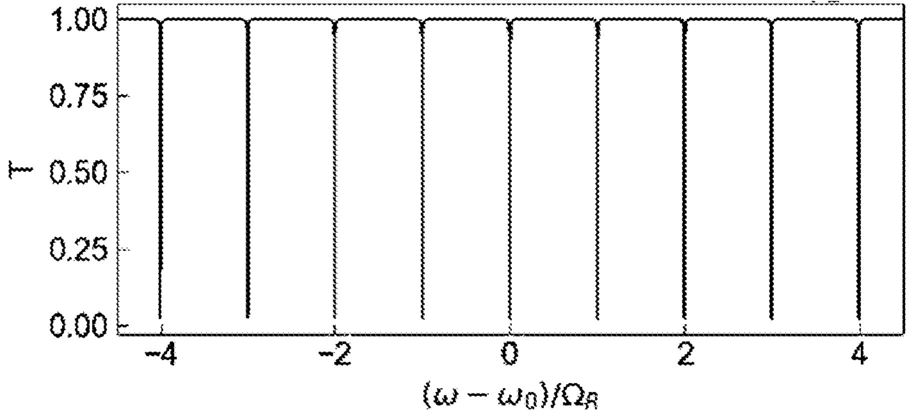
FIGS. 7B-E show results relating to the example of FIG. 7A.
Figure 7C:
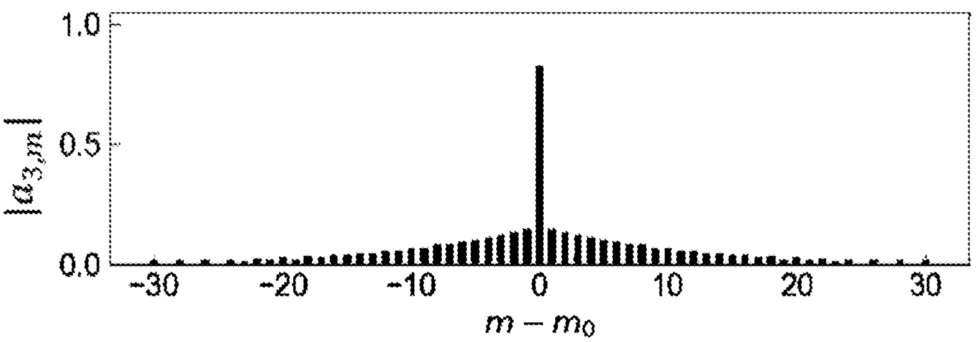
Figure 7D:
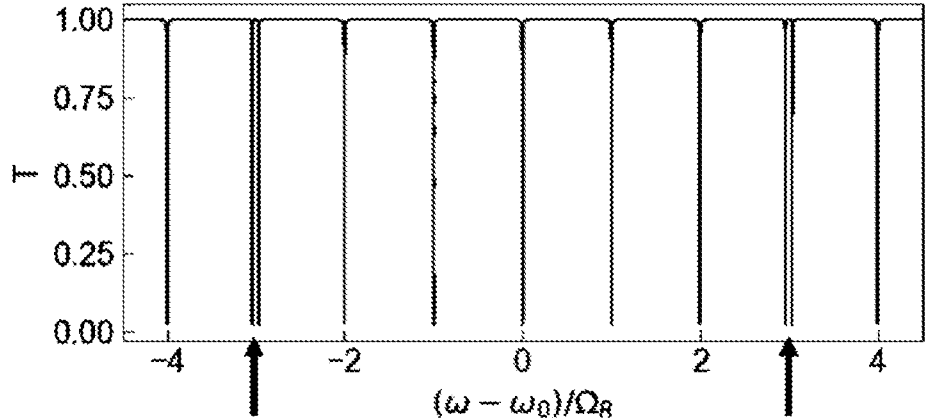

In the absence of modulation, $a_5=a_4$. For a single frequency continuous wave excitation, we can solve Eqs. (S15) and (S16) by assuming $a_1=1$ and calculating $a_3$. The transmission spectrum T at the through-port of the ring is plotted in FIGS. 7B and 7D without ($t_1=0$) and with ($t_1=t_e$) the auxiliary ring, respectively. Without the auxiliary ring, the modes are equally spaced, showing resonances for $(\omega-\omega_0)/\Omega_R$ being an integer. In the presence of an auxiliary ring with a length $L_1=L/6$, every sixth mode is split into a doublet. Hence, a set of 5 modes are equally spaced, which can be coupled by the modulation at the FSR, but the split doublets at every sixth mode cannot be coupled by the modulation. This creates a one-mode boundary separating sets of 5 modes. We confirmed in our simulations that boundaries having a larger number of modes can be formed by choosing a non-integer $L_1/L$ and/or by using additional auxiliary rings. Note that for these calculations we assumed an intrinsic loss rate $\gamma_i=\gamma_e$ only to observe resonant dips in the transmission, but for high fidelity linear transformations, we set $\gamma_e>>\gamma_i$, i.e. the ring is strongly over-coupled to the external waveguide. In this case, the transmission spectrum is near unity for both on and off resonance, but there are large on-resonance group delays.

In the presence of modulation, the fields $a_5$ and $a_4$ are coupled by the electro-optic modulator. In this case, each of the fields includes multiple frequency components denoted as Floquet side bands, where the frequency of the Floquet sidebands are determined both by the input frequency $\omega_{in}$ and the modulation frequency $\Omega_{mod}$ as follows: $\omega'_m=\omega_{in}+m\Omega_{mod}$.

Thus, the propagation phases $\theta_0(\omega)$ and $\theta_1(\omega)$ are dependent on the order of the Floquet sideband. The relation between the fields before and after the modulator in the S-matrix formalism can be obtained by exponentiating the K matrix (see the discussion around Eq. (4) above) from the coupled-mode theory:

$$S_K = e^{iKT_R} \tag{13}$$

$$a_{5,m} = \sum\nolimits_n [S_k]_{m,n} a_{4,n} \tag{14}$$

Using a large enough number of Floquet sidebands for calculations, the form of the matrix $S_K$ for a single modulation frequency $\Omega_{mod}=\Omega_R$ (such that only $k_1$ is nonzero) is:

$$S_\kappa \approx \begin{pmatrix} \ddots & \vdots & \vdots & \vdots & \\ \cdots & J_0(\kappa_1 T_R) & J_1(\kappa_1 T_R) & J_2(\kappa_1 T_R) & \cdots \\ \cdots & J_{-1}(\kappa_1 T_R) & J_0(\kappa_1 T_R) & J_1(\kappa_1 T_R) & \cdots \\ \cdots & J_{-2}(\kappa_1 T_R) & J_{-1}(\kappa_1 T_R) & J_0(\kappa_1 T_R) & \cdots \\ & \vdots & \vdots & \vdots & \ddots \end{pmatrix} \tag{15}$$

Figure 7E:
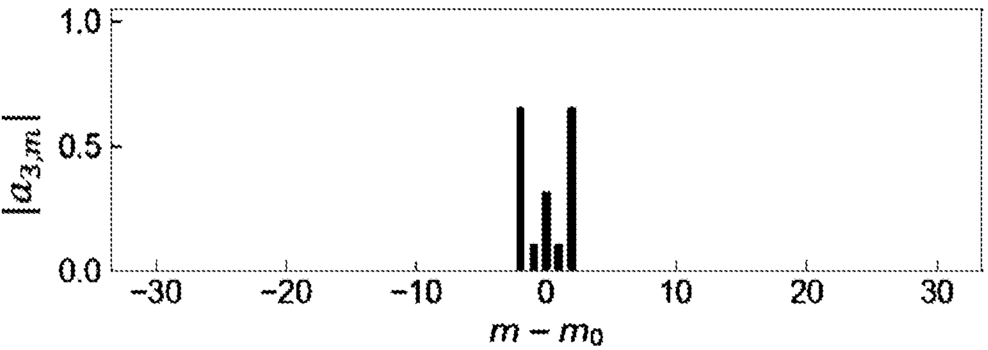

Using such a construction, we can calculate the steady state output frequency content for a certain input. In particular, we can check if the creation of boundaries in the synthetic dimension restricts the propagation of light to within the bounded set of modes without causing additional loss. We show this in FIGS. 7C and 7E for the cases without a boundary and with a boundary respectively. In the absence of coupling to the auxiliary ring, the input at $m_0$ spreads out into a large number of modes (FIG. 7C), whereas in the presence of the boundary created by coupling to the auxiliary ring, 99.98% of the power stays localized within the 5 modes of interest (FIG. 7E). As in the unmodulated case, we checked that this behavior can be extended for multiple modulation tones by using non-integer values of $L_1/L$ and/or by using additional auxiliary rings.

The invention claimed is:

1. Apparatus comprising:

one or more resonators coupled to a waveguide in sequence;

wherein each of the one or more resonators includes a corresponding modulator;

wherein $N_f$ is a number of frequency components, wherein $N_f>1$, wherein $\Omega_R$ is a free spectral range of a frequency comb defined by the one or more resonators, wherein $\theta_l$ is a phase of an l-th frequency component, and wherein $A_l$ is an amplitude of an l-th frequency component;

a signal controller configured to electrically drive each modulator with a corresponding composite electrical signal $$\sum\nolimits_{l=1}^{N_f} A_l \cos(l\Omega_R t + \theta_l);$$

whereby an input-output relation between an input of the waveguide and an output of the waveguide is a linear transformation defined by the composite electrical signals using frequencies of the frequency comb as a basis.

2. The apparatus of claim 1, wherein the one or more resonators include one or more adjustable resonators having adjustable center frequencies.

3. The apparatus of claim 2, further comprising a closed-loop controller configured to adjust the adjustable center frequencies of the one or more adjustable resonators to lock the selected resonators to the frequency comb.

4. The apparatus of claim 1, wherein the one or more resonators include one or more band-limited resonators that act only on a predetermined set of frequencies of the frequency comb.

5. The apparatus of claim 4, wherein at least one band-limited resonator is coupled to an auxiliary resonator such that selected resonator modes of the at least one band-limited resonator are perturbed away from the frequency comb to provide band-limiting.

6. The apparatus of claim 1, wherein the composite electrical signals are derived from the linear transformation using automatic differentiation to expedite gradient-based inverse numerical design.

7. The apparatus of claim 1, wherein the linear transformation is unitary.

8. The apparatus of claim 1, wherein the linear transformation is non-unitary.

9. The apparatus of claim 1, wherein the linear transformation is reciprocal.

10. The apparatus of claim 1, wherein the linear transformation is non-reciprocal.

* * * * *